(12) United States Patent
Dallum et al.

(10) Patent No.: US 8,355,453 B2
(45) Date of Patent: Jan. 15, 2013

(54) UWB TRANSMITTER

(75) Inventors: Gregory E. Dallum, Livermore, CA (US); Garth C. Pratt, Discovery Bay, CA (US); Peter C. Haugen, Livermore, CA (US); Carlos E. Romero, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 494 days.

(21) Appl. No.: 12/637,715

(22) Filed: Dec. 14, 2009

(65) Prior Publication Data

US 2011/0013673 A1    Jan. 20, 2011

Related U.S. Application Data

(60) Provisional application No. 61/138,047, filed on Dec. 16, 2008.

(51) Int. Cl.
*H04L 27/00* (2006.01)

(52) U.S. Cl. ............................. 375/259; 375/295; 342/82

(58) Field of Classification Search .................. 375/130, 375/140, 141, 146, 219, 256, 259, 295; 342/13, 342/42, 82; 332/106, 112, 113
See application file for complete search history.

(56) References Cited

U.S. PATENT DOCUMENTS

| | | | | |
|---|---|---|---|---|
| 4,060,739 | A * | 11/1977 | Russer et al. ................. | 327/585 |
| 6,937,667 | B1 * | 8/2005 | Fullerton et al. .............. | 375/295 |
| 7,113,013 | B2 * | 9/2006 | Kawata ........................ | 327/170 |
| 7,792,229 | B2 * | 9/2010 | Sanada et al. ................. | 375/354 |
| 8,160,118 | B2 * | 4/2012 | Dallum et al. ................ | 375/130 |

* cited by examiner

*Primary Examiner* — Dac Ha
(74) *Attorney, Agent, or Firm* — John P. Wooldridge

(57) ABSTRACT

An ultra-wideband (UWB) dual impulse transmitter is made up of a trigger edge selection circuit actuated by a single trigger input pulse; a first step recovery diode (SRD) based pulser connected to the trigger edge selection circuit to generate a first impulse output; and a second step recovery diode (SRD) based pulser connected to the trigger edge selection circuit in parallel to the first pulser to generate a second impulse output having a selected delay from the first impulse output.

15 Claims, 22 Drawing Sheets

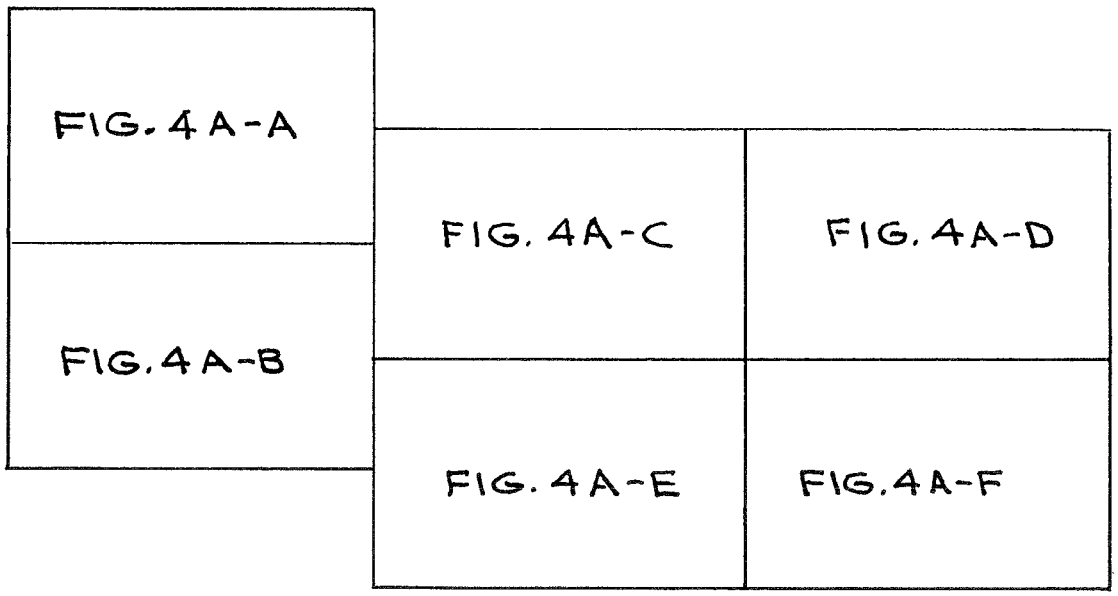
MAP FOR FIG. 4A
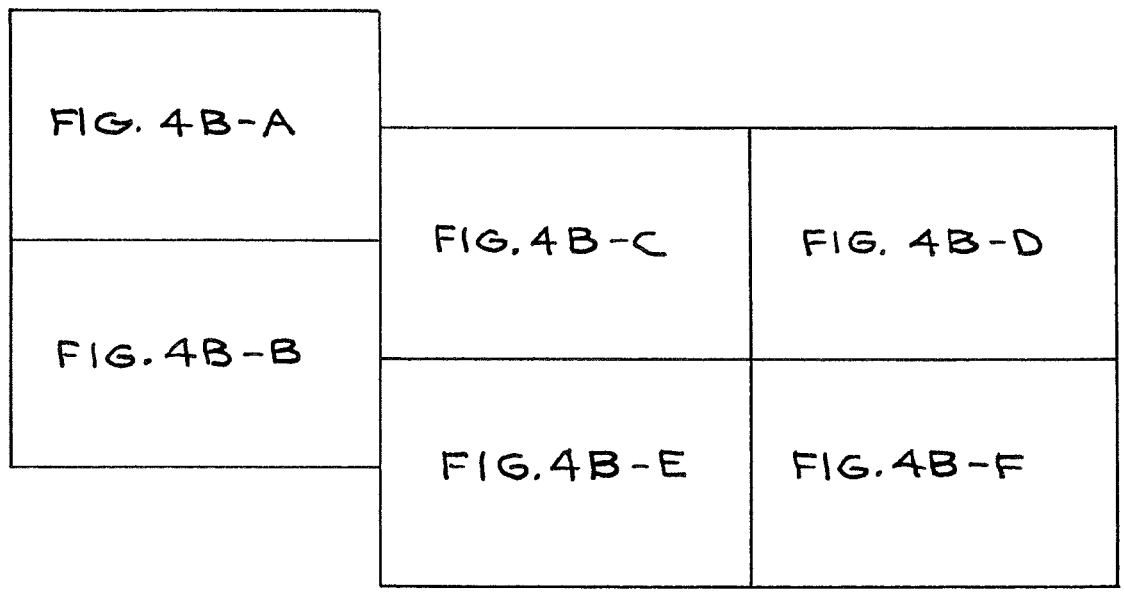
MAP FOR FIG. 4B

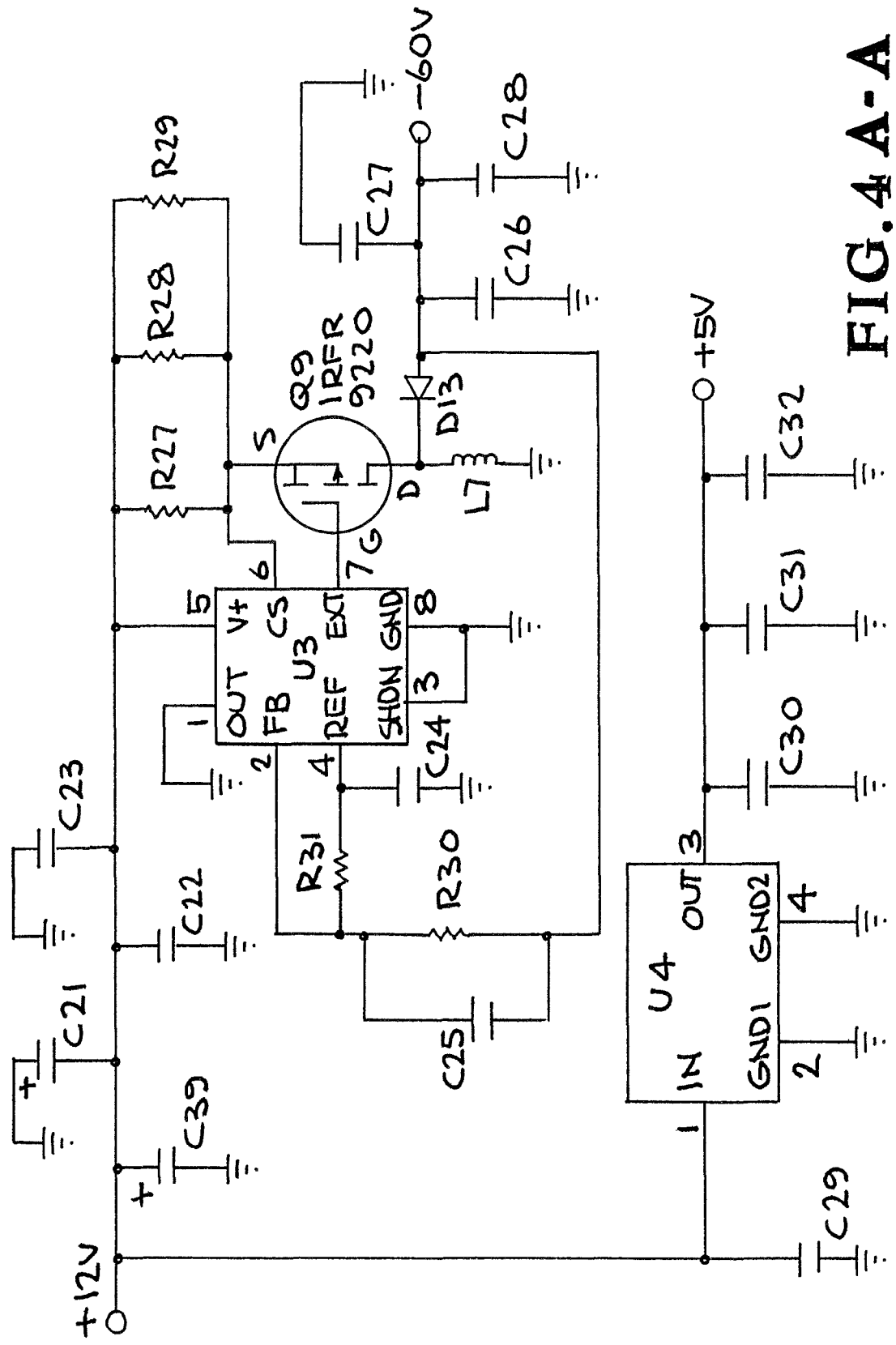
FIG. 4A-A

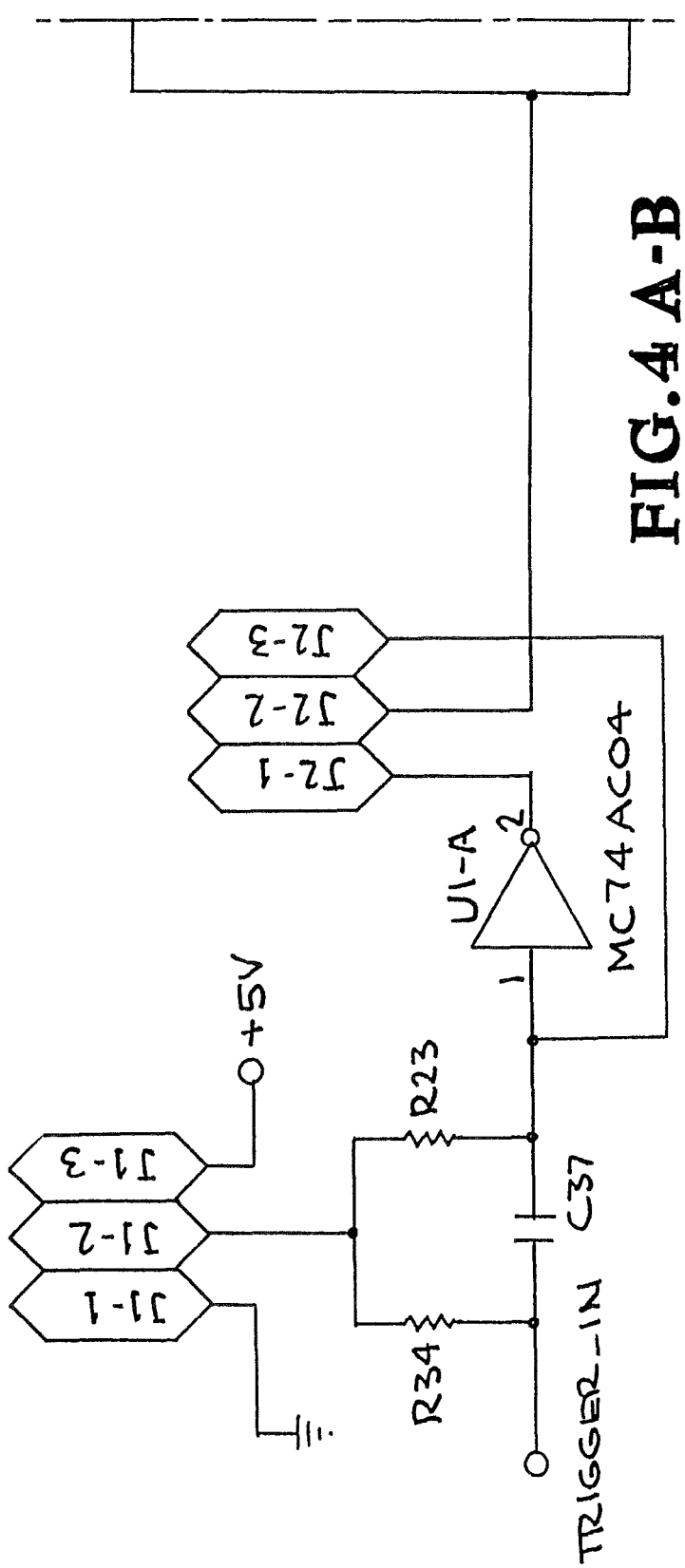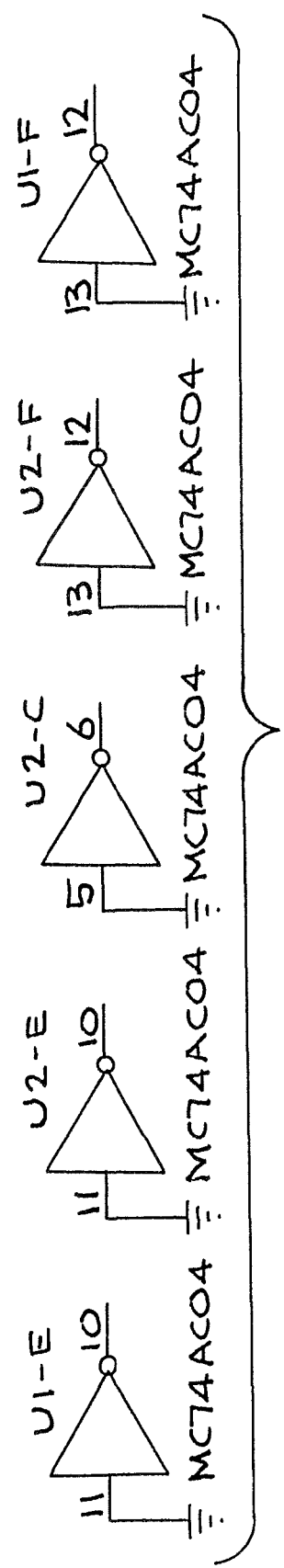
FIG. 4A-B

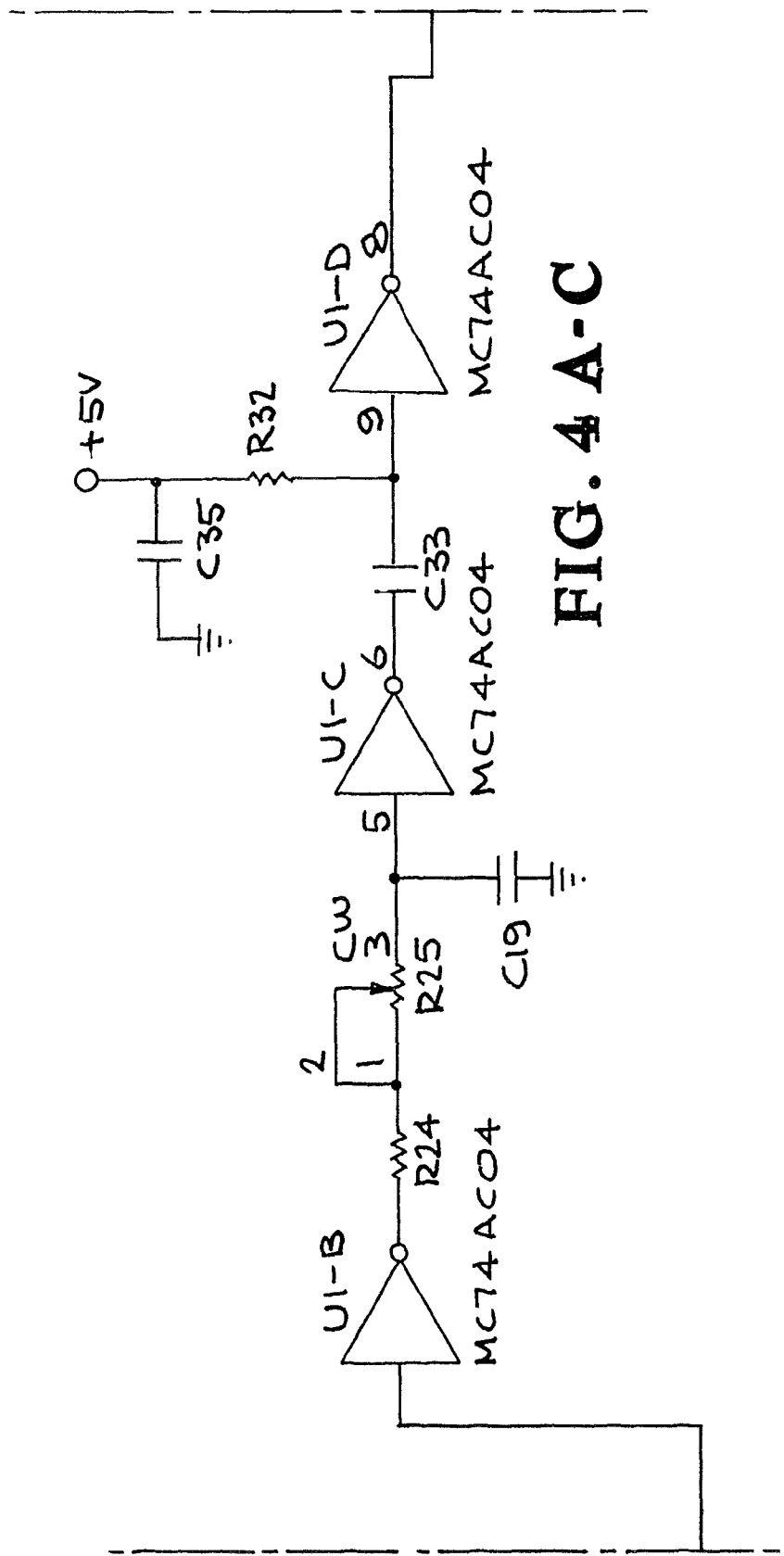
FIG. 4A-C

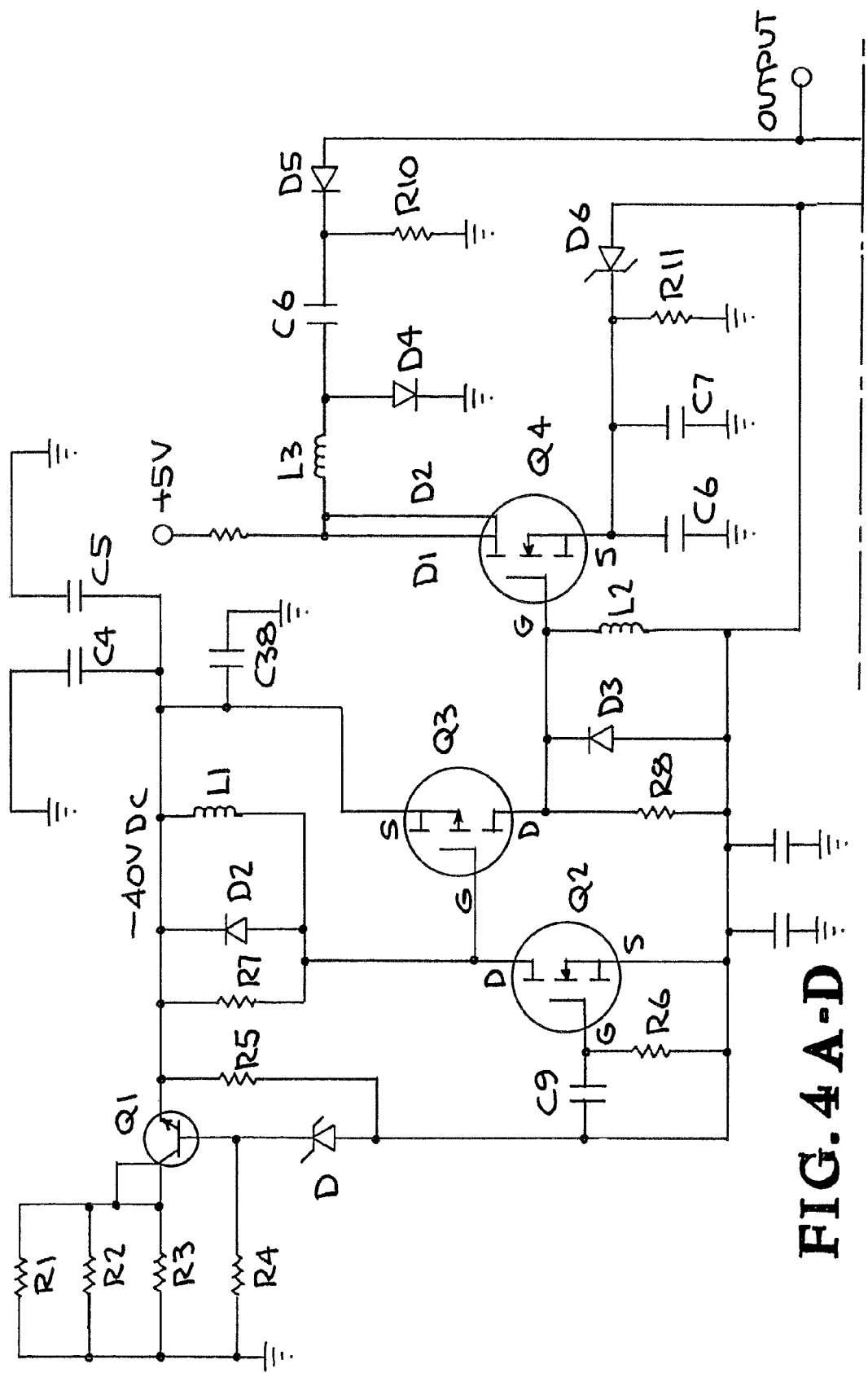
FIG. 4A-D

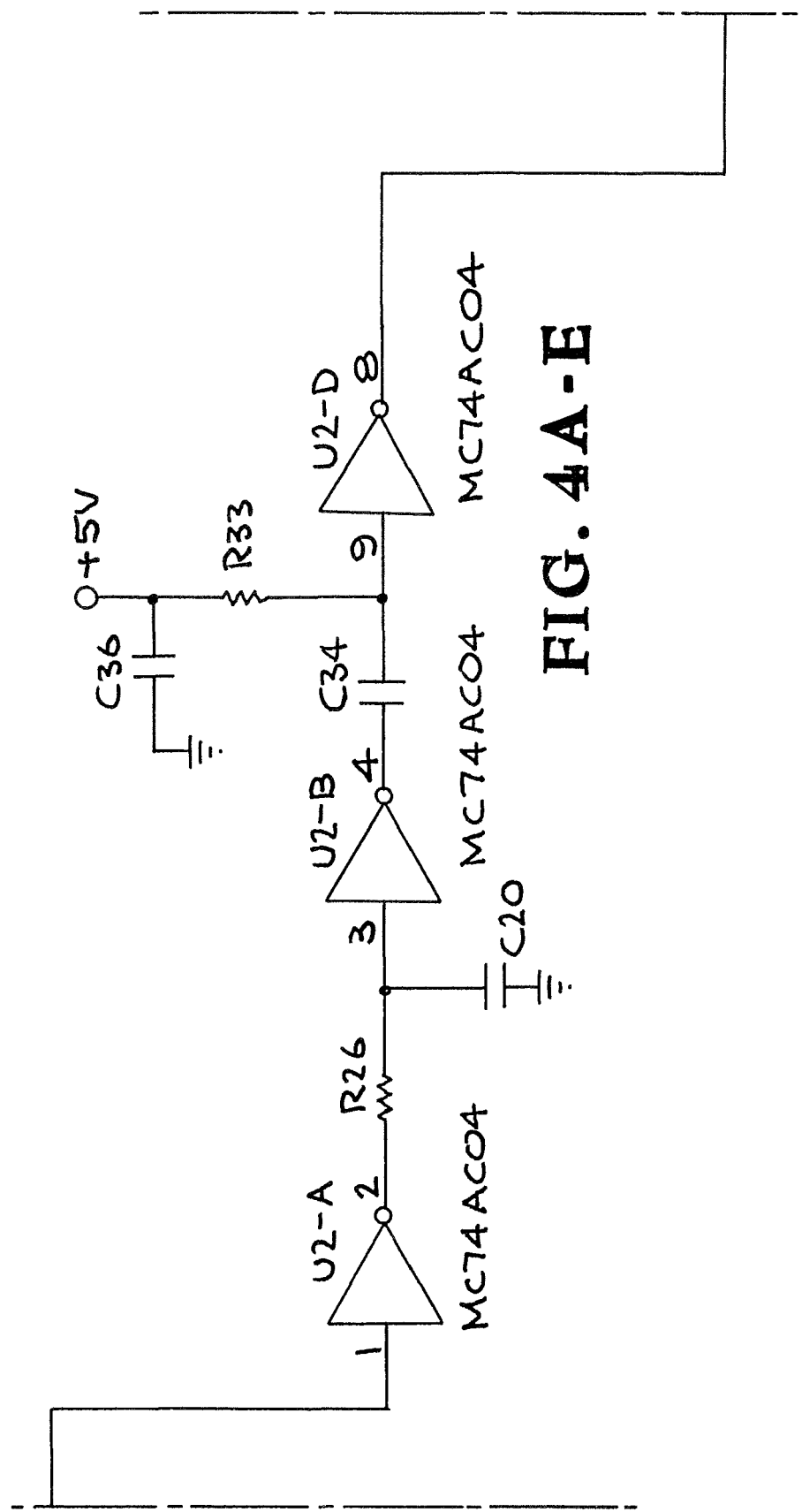
FIG. 4A-E

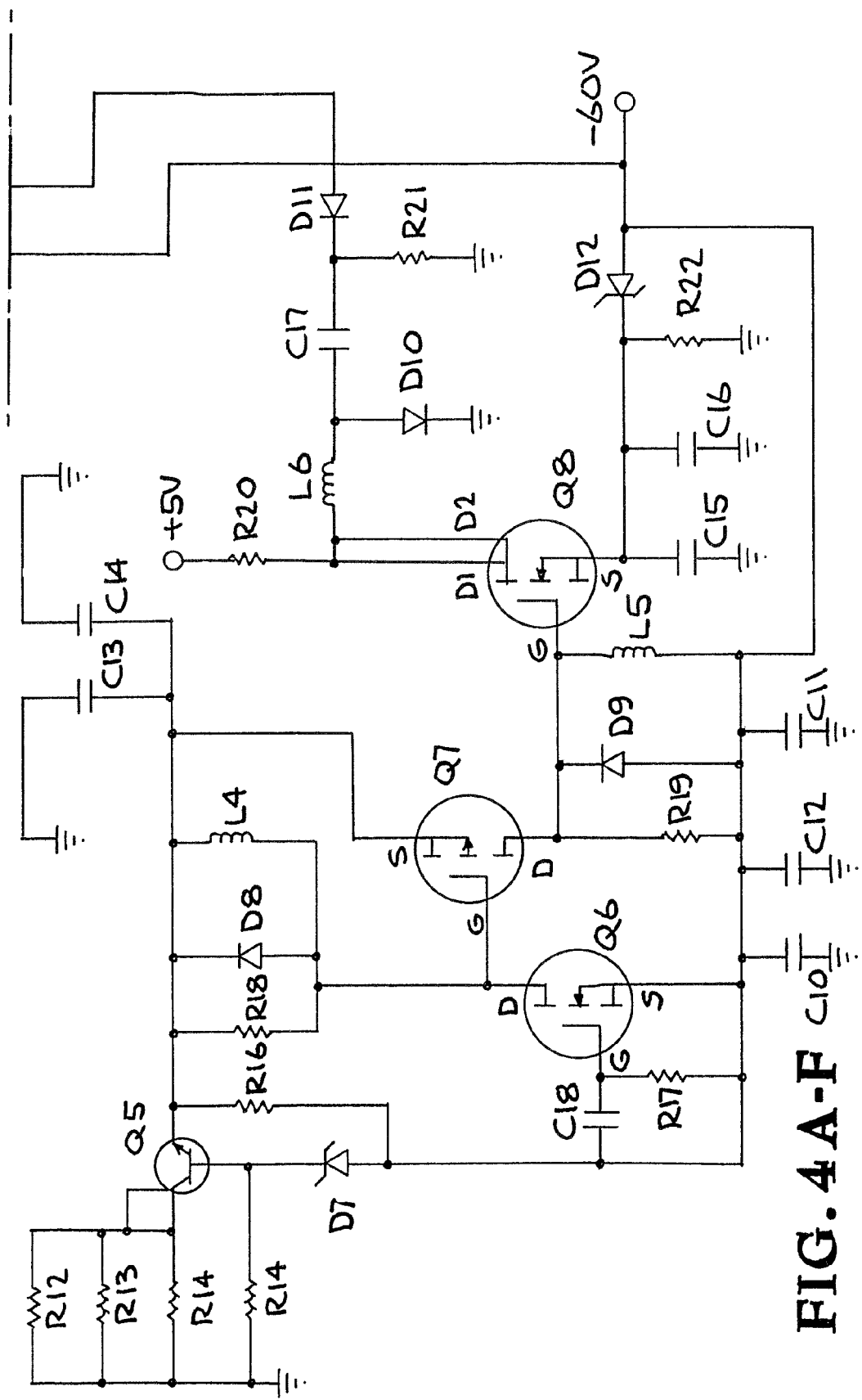
FIG. 4A-F

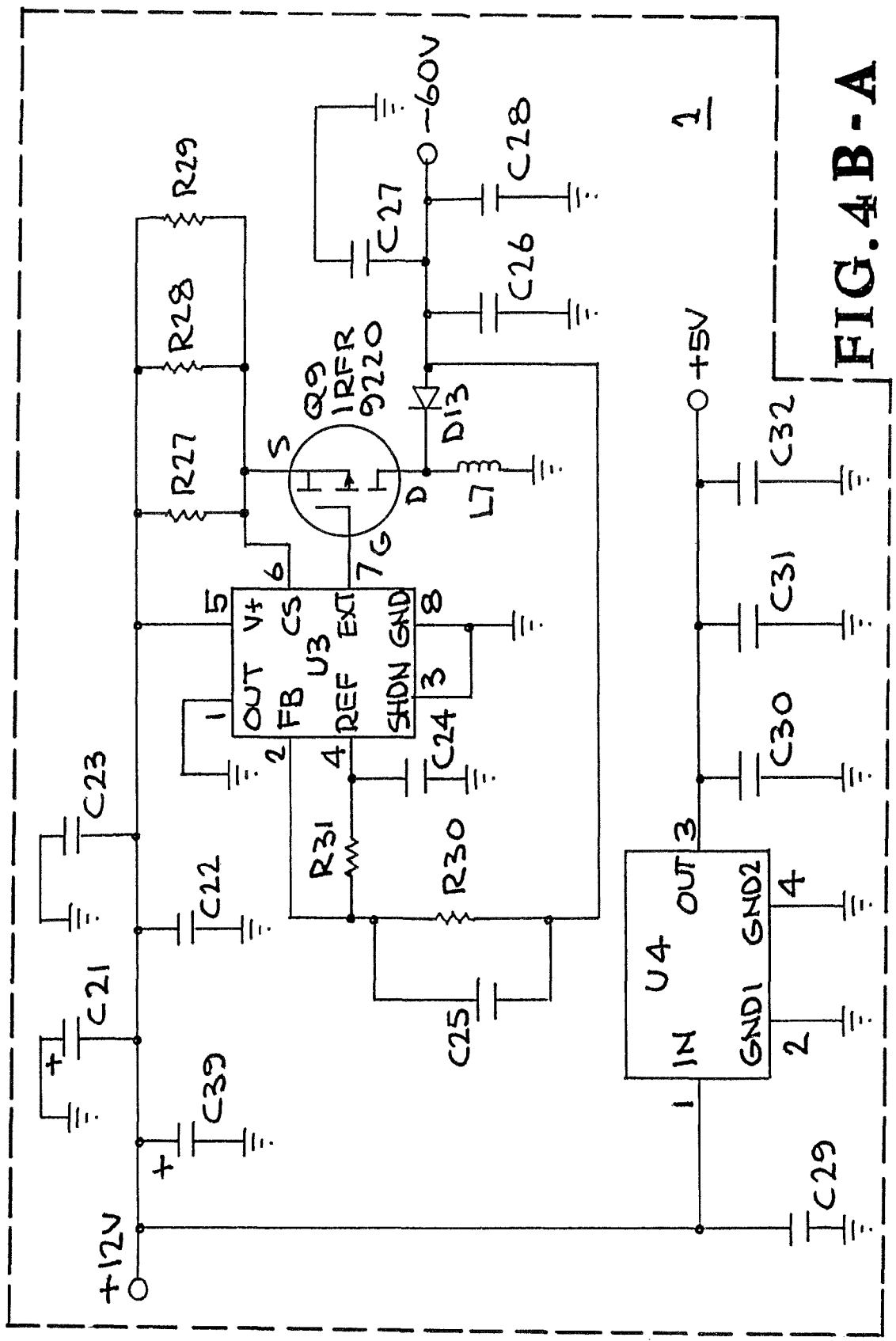
FIG. 4B-A

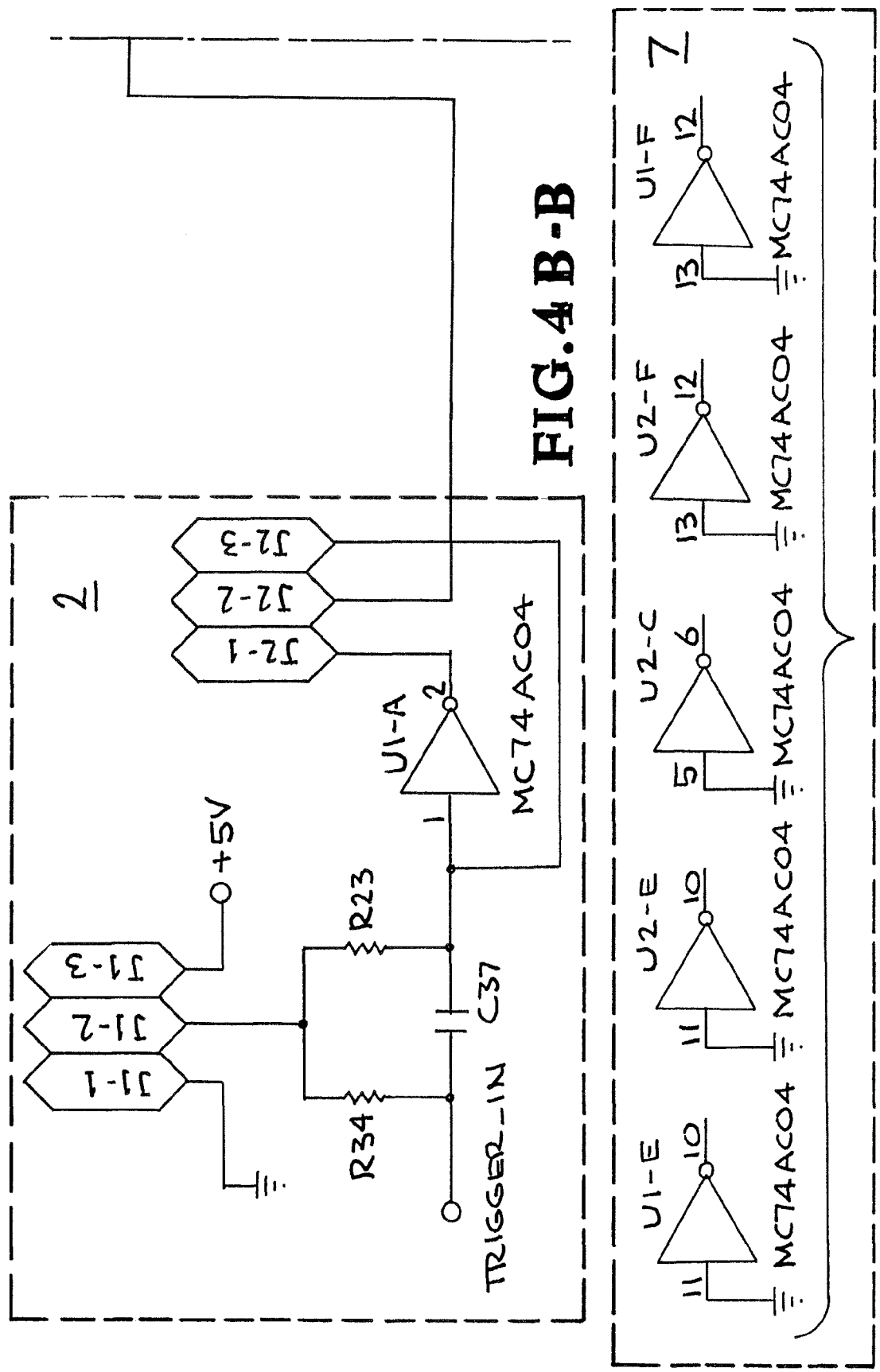
FIG. 4B-B

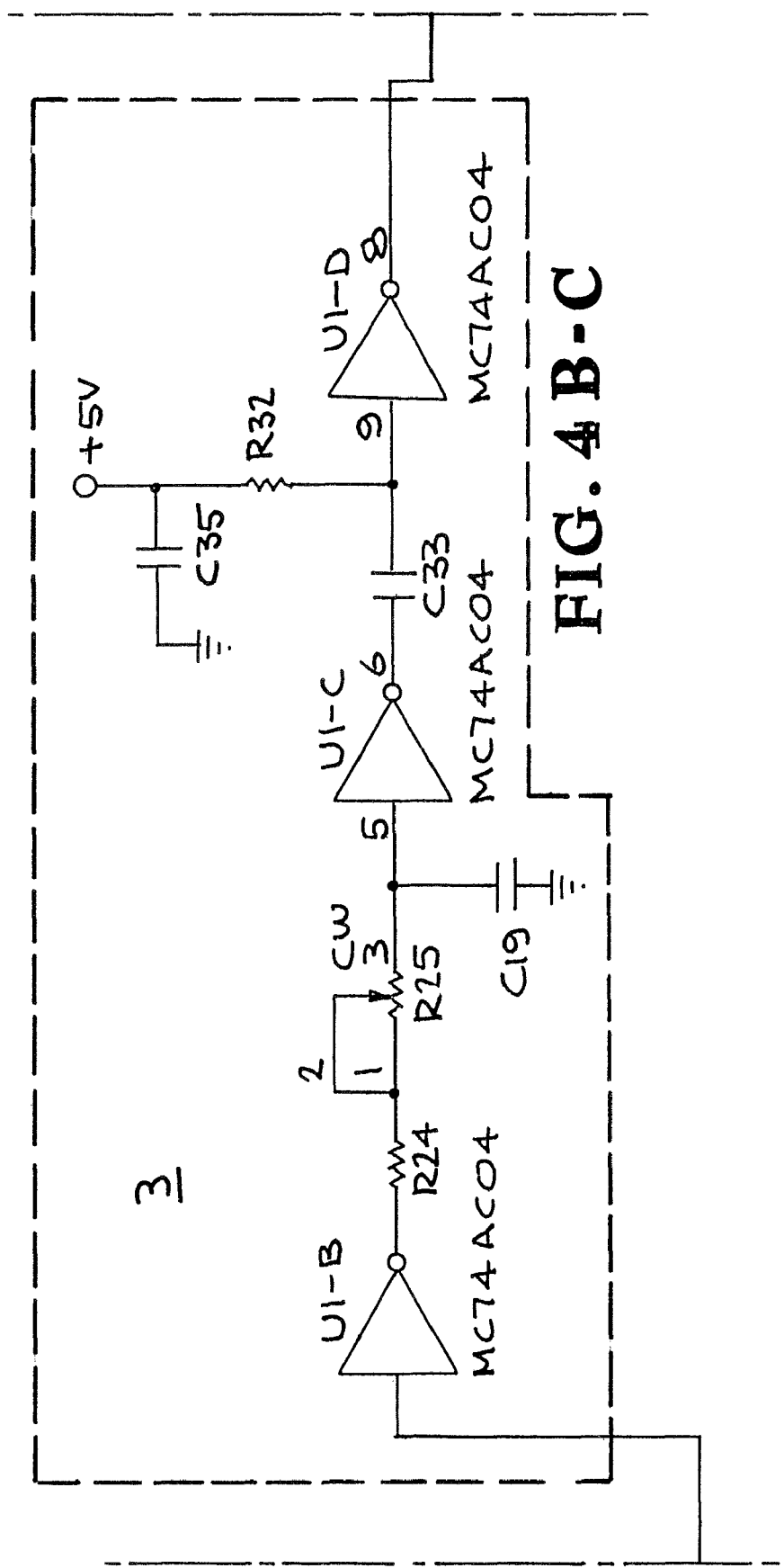
FIG. 4 B-C

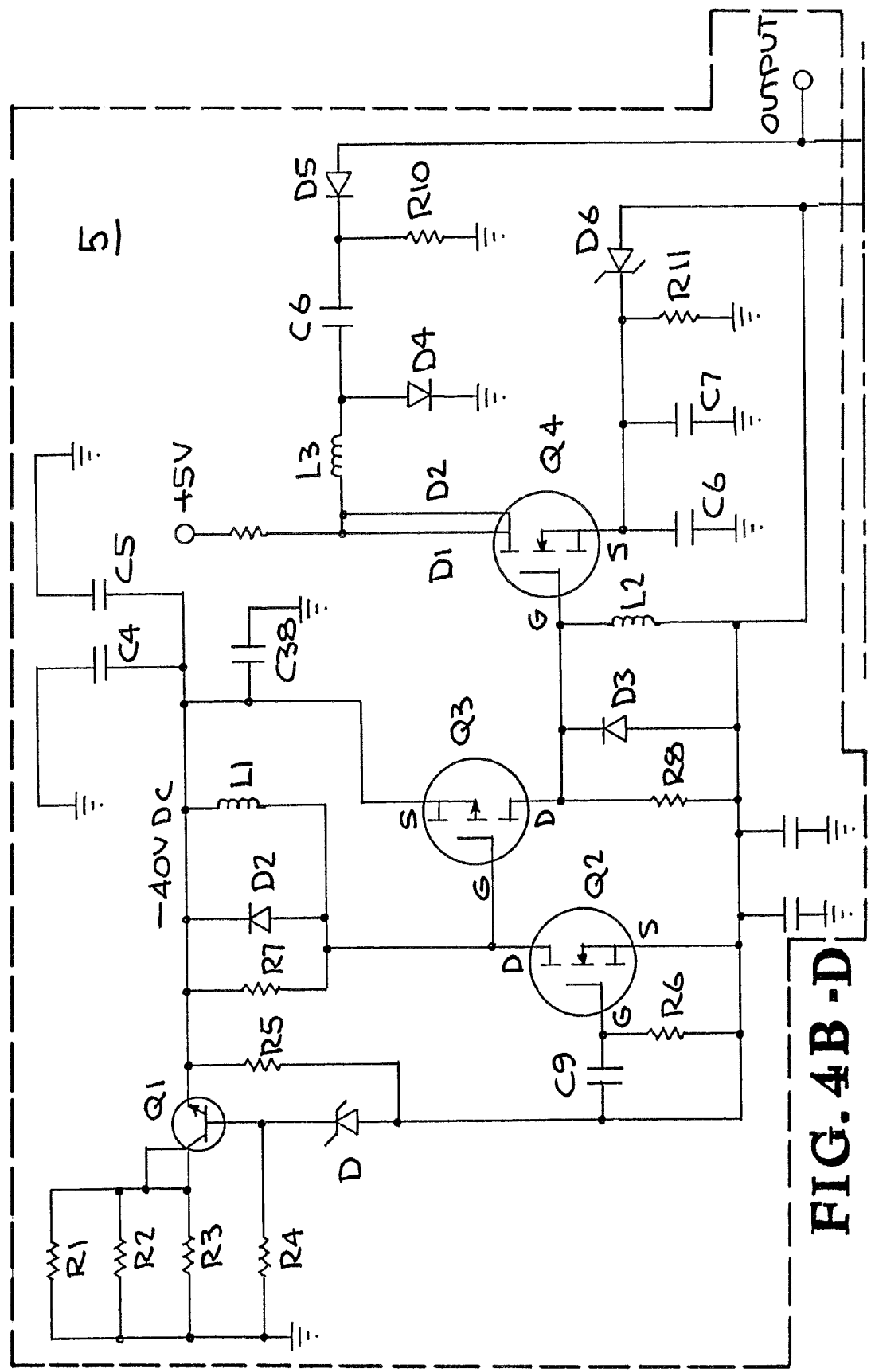
FIG. 4B-D

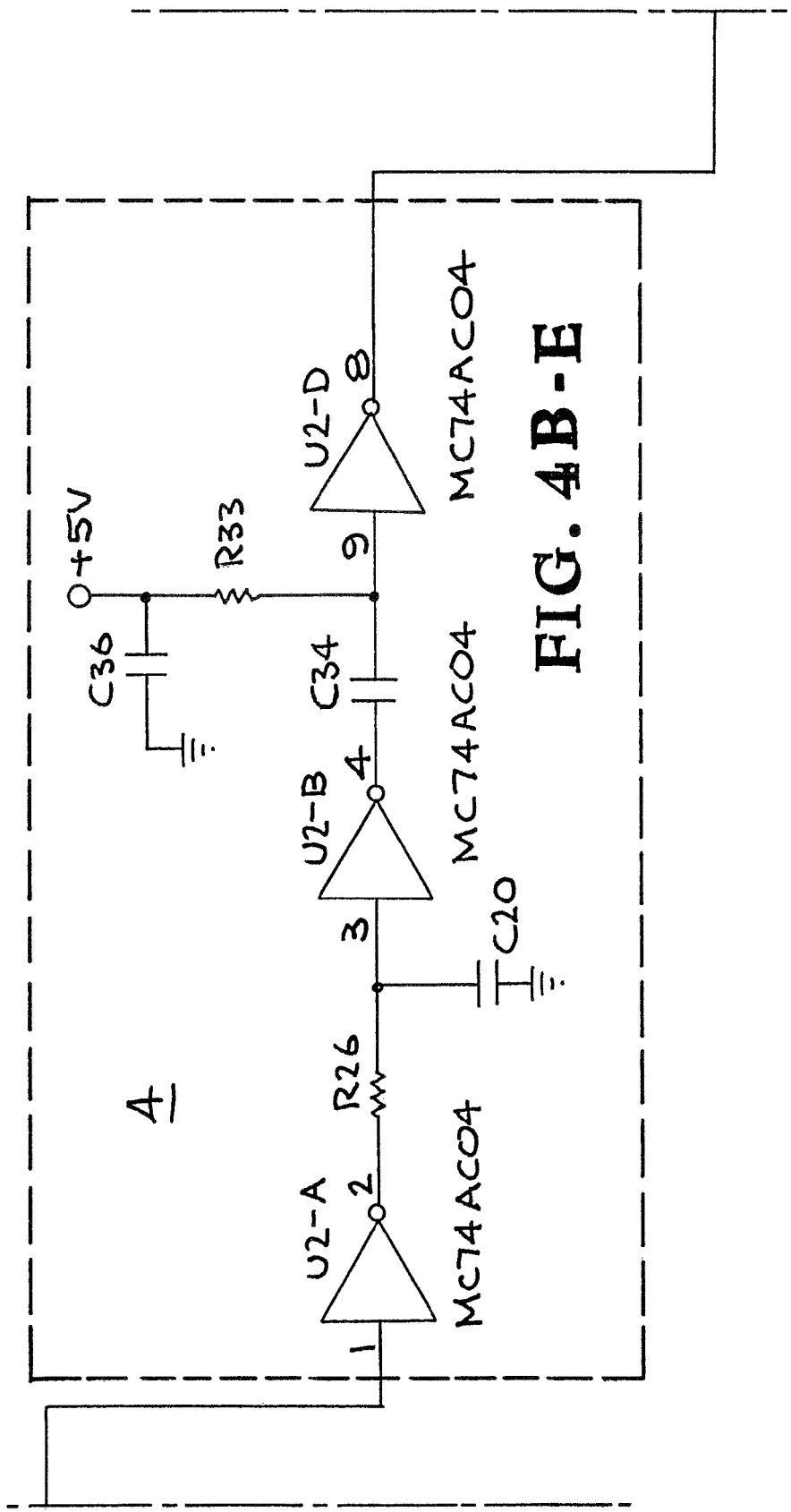
FIG. 4B-E

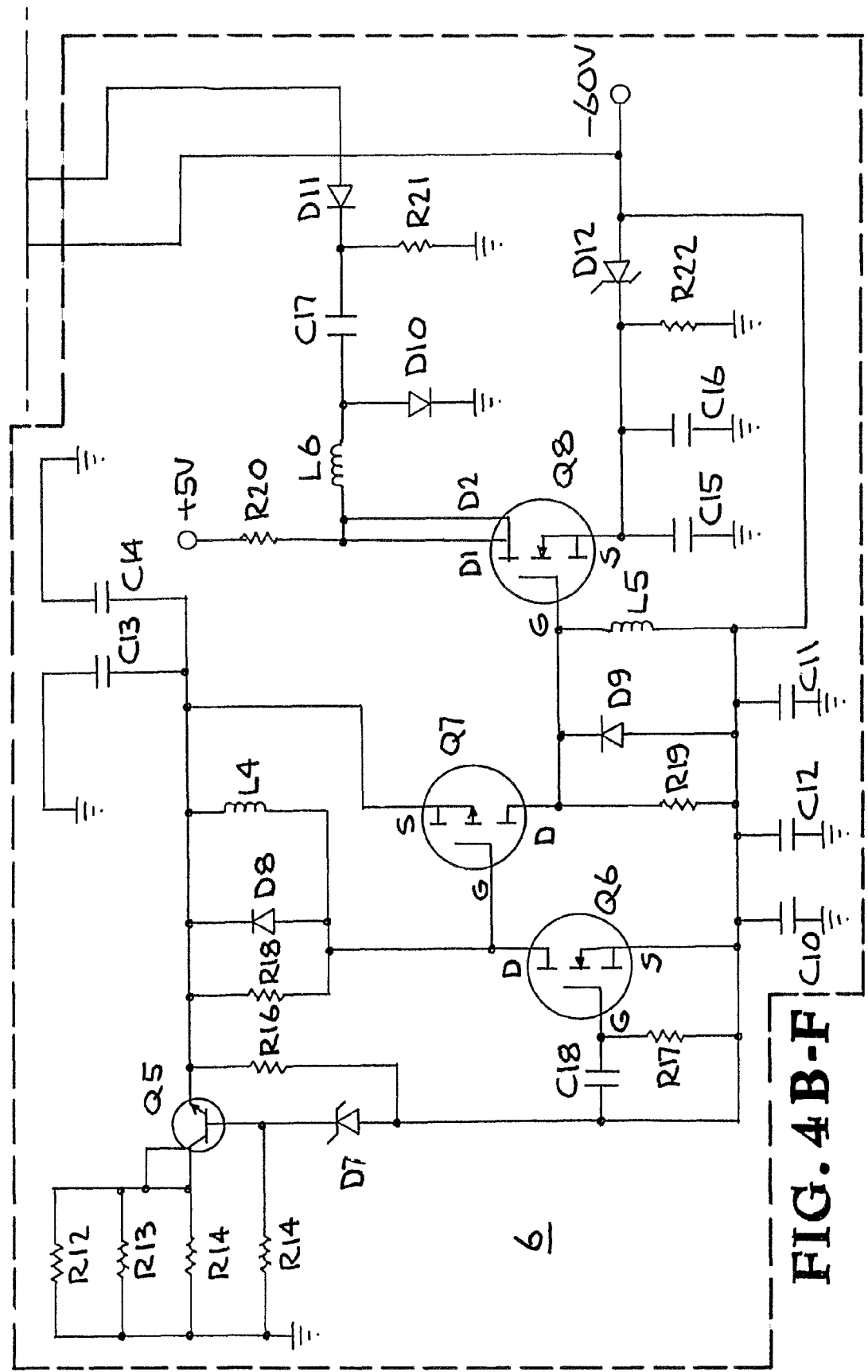
FIG. 4B-F

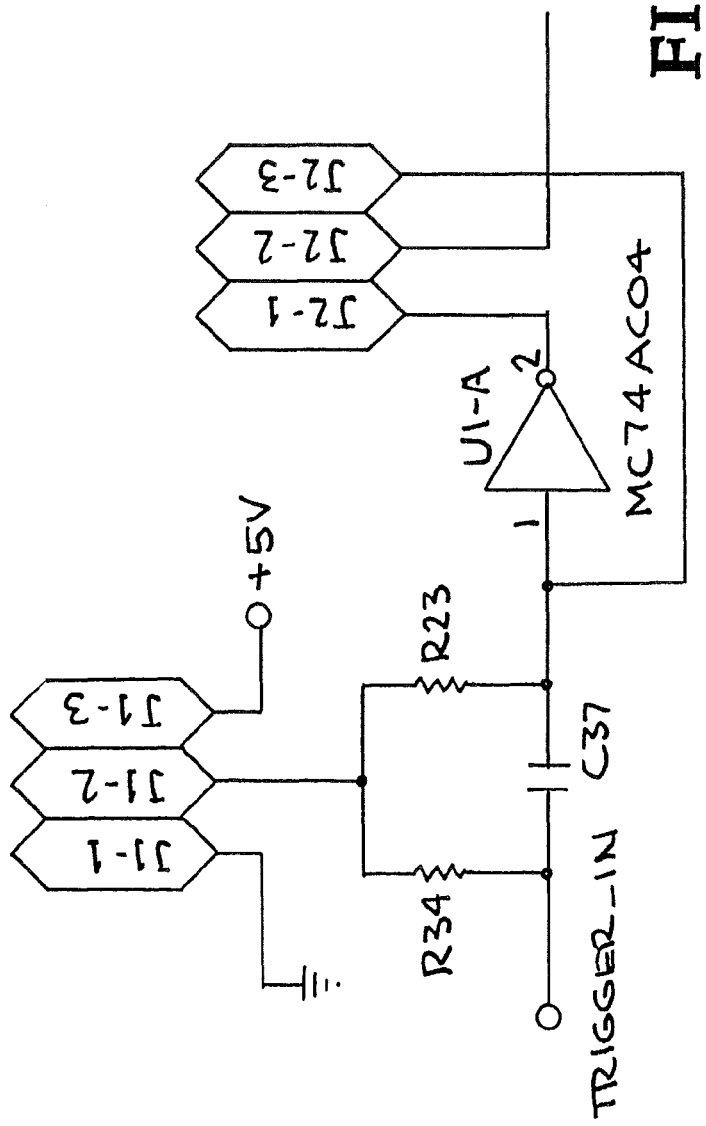
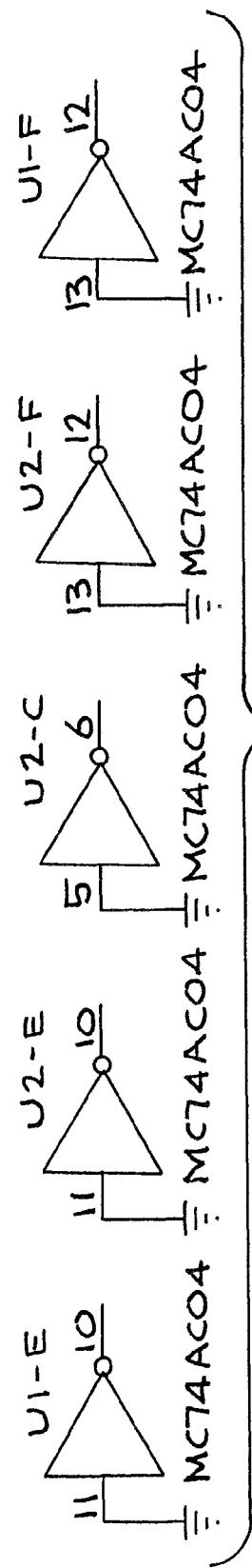
FIG. 4D
FIG. 4I

UWB TRANSMITTER

RELATED APPLICATIONS

This application claims priority to U.S. Provisional No. 61/138,047, titled "Enhanced UWB Impulse Generator," filed Dec. 16, 2008 and incorporated herein by reference.

GOVERNMENT RIGHTS

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

This invention pertains generally to ultra-wideband communications, and more particularly to ultra-wideband (UWB) transmitters.

2. Description of Related Art

Ultra-wideband (UWB) wireless communication is based on the transmission of data in extremely short (50-1000 ps) pulses spread out over a broad range or bandwidth (typically several GHz) of the electromagnetic spectrum. Large data bursts, e.g. hundreds of Gb/s, are possible because the data are carried simultaneously at a wide range of frequencies across the electromagnetic spectrum.

UWB communications offers many advantages. UWB signals are more difficult to detect than narrowband (essentially single frequency) signals. The combination of broad spectrum, low power, and extremely short pulses also cause much less interference with other devices than do conventional narrowband wireless systems. Also, UWB is much more resistant to electrical interference from other devices than other wireless technology. Thus, UWB's data capacity, speed, low power requirements, and resistance to interference make it attractive as a communications technology.

UWB pulses spread the transmitted energy over many frequencies, over a band of typically several GHz, as opposed to traditional narrowband, which generally operates as a continuous wave at a specific frequency and covers a limited band of about 30 KHz. Cellular phones operate in the wideband, which covers about 5 MHz. UWB bandwidth provides high capacity, resistance to jamming, and low probability of detection. Thus UWB provides an attractive alternative to the other communications technologies. At present, the FCC restricts commercial UWB systems, but Government use is less restricted. UWB appears very promising for the future.

One type of receiver used in UWB communications systems is a delay and multiply receiver in which a received pulse is multiplied by a delayed prior received pulse to increase the magnitude. This requires a precise spacing between the transmitted pulses so that the delay can be chosen so that the presently received pulses are coincident with the delayed previously received pulses. It is also required that the pulses be in phase so that when they are multiplied they do not cancel out. At a minimum, a pair of pulses is required.

Thus, it is desirable to provide an UWB transmitter capable of generating a pair of RF bursts or impulses with precise spacing between the bursts or impulses.

It is also desirable to provide an UWB transmitter capable of generating a precisely spaced pair of RF bursts where each burst starts up at the same phase as the other bursts.

BRIEF SUMMARY OF THE INVENTION

An aspect of the invention is an ultra-wideband (UWB) dual impulse transmitter, formed of a trigger edge selection circuit actuated by a single trigger input pulse; a first step recovery diode (SRD) based pulser connected to the trigger edge selection circuit to generate a first impulse output; and a second step recovery diode (SRD) based pulser connected to the trigger edge selection circuit in parallel to the first pulser to generate a second impulse output having a selected delay from the first impulse output.

BRIEF DESCRIPTION OF THE DRAWINGS

The invention will be more fully understood by reference to the following drawings which are for illustrative purposes only:

FIG. 4A shows schematic of an UWB impulse generator of the invention.

FIG. 4B shows the schematic of FIG. 4A divided into blocks 1-7.

FIG. 4D shows block 2 of FIG. 4B.
FIG. 4I shows block 7 of FIG. 4B.

DETAILED DESCRIPTION OF THE INVENTION

Referring more specifically to the drawings, for illustrative purposes the present invention is embodied in the apparatus generally shown in FIG. 1 through FIG. 4. It will be appreciated that the apparatus may vary as to configuration and as to details of the parts, without departing from the basic concepts as disclosed herein.

UWB Transmitter

The invention includes a dual impulse transmitter that is used in ultra-wideband (UWB) communication systems. The circuit generates dual impulses from a single trigger event. Each impulse has a peak of about 50 V.

One technique in ultra-wideband (UWB) communications involves a delay and multiply receiver topology. This receiver technique requires two input signals that can be delayed and overlaid on top of one another to detect a valid signal. This requires a transmitted signal that is comprised of two pulses that are delayed by a fixed, stable and repeatable amount of time.

The transmitter of the invention generates two 50 volt peak, impulse transmitter outputs from a single trigger input. The circuit is comprised of two parallel step-recovery diode based pulsers that are combined at the output to generate the desired signal. One of the output pulses has a small variable delay relative to the trigger input. The other pulse is delayed longer and is nonvariable with respect to the input trigger. In an illustrative embodiment of the transmitter, the delay between the two output pulses is set to 30 ns. This can be changed to any desired delay by changing component values in the circuit.

The input trigger can be selected to generate the desired output on either the rising or falling edge of this signal. The trigger is split to feed both pulse generators. One trigger path has a small adjustable delay built in to fine tune the delay spacing of the two pulses. The other trigger path has a longer delay that is derived from a fixed RC delay. These trigger signals then feed two based pulse amplifiers which feed two step recovery-based pulse forming networks. Each pulse amplifier is a 3 stage MOSFET based current and voltage amplifier. The output of the step-recovery diode is a negative going impulse that is 50 volts in amplitude. The pulse width is determined by the value of the output coupling capacitor into a nominal 50 ohm load. The two output pulses are isolated from one another and combined by two diodes. The pulsers are designed to drive a terminated UWB antenna. Power supply voltage converters provide the appropriate voltage levels and current demands of the circuit. With particular component values, the trigger frequency can extend to 1 MHz. Using different components/values can extend the operating frequency.

Figure 1:
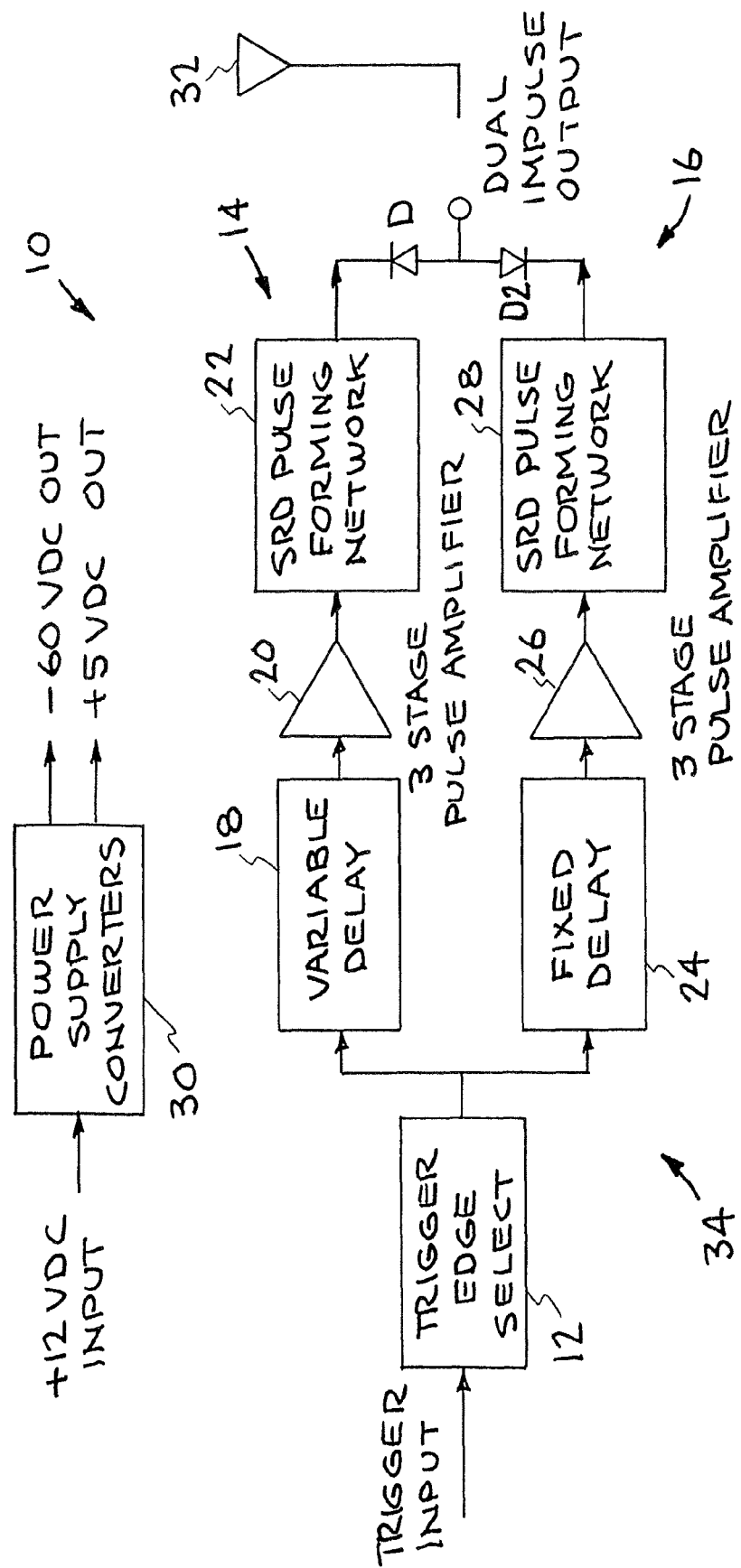
FIG. 1 is a schematic block diagram of an UWB dual impulse transmitter of the invention.

FIG. 1 shows an UWB dual impulse transmitter 10 of the invention. A trigger input pulse is input into a trigger edge select circuit 12. The output of trigger edge select circuit 12 is input into a parallel pair of pulsers 14, 16. Pulser 14 is made up of a variable delay trigger pulse generator 18 followed by a pulse amplifier 20 followed by a SRD pulse forming network 22. Pulser 16 is made up of a variable delay trigger pulse generator 24 followed by a pulse amplifier 26 followed by a SRD pulse forming network 28. The outputs of pulsers 14, 16 are combined through diodes D1, D2 and the dual impulse output is applied to a transmit antenna 32. There are also power supply converters 30 used to provide the correct bias and operating voltages for the circuits. Trigger edge select circuit, and variable and fixed delay pulse generators 18, 24 form a dual trigger generator 34.

Figure 2:
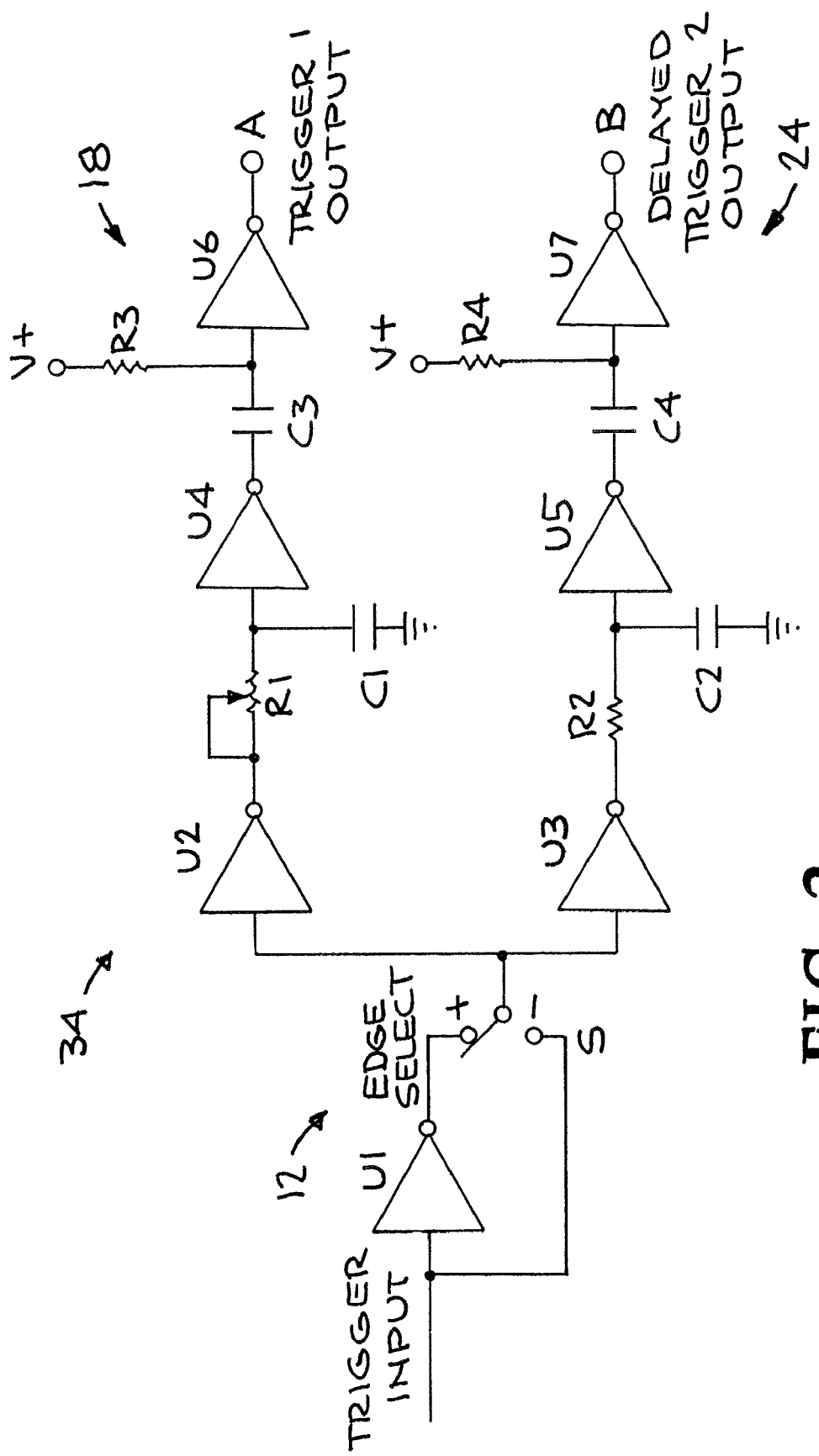
FIG. 2 is a circuit diagram of an embodiment of the dual trigger generator of the UWB dual impulse transmitter of FIG. 1.

FIG. 2 is a more detailed circuit diagram of the dual trigger generator 34. Trigger edge select circuit 12 is formed of an inverter U1 followed by a switch S which can connect to either the input or output of U1. Variable delay pulse generator 18 is formed of an inverter U2, variable resistor R1, capacitor C1, inverter U4, capacitor C3, resistor R3, and inverter U6. U2 is connected to switch S. R1 is connected from U2 to the input of U4. C1 is connected from the input of U4 to ground. The output of U4 is connected through C3 to the input of U6. The input of U6 is also connected through R3 to a voltage source V+. R1 and C1 form a delay circuit. C3 and R3 form a differentiator. The output of U6 is connected to trigger 1 output node A, which provides the initial (nondelayed) trigger pulse.

Fixed delay pulse generator 24 is formed of an inverter U3, variable resistor R2, capacitor C2, inverter U5, capacitor C4, resistor R4, and inverter U7. U3 is connected to switch S. R2 is connected from U3 to the input of U5. C2 is connected from the input of U5 to ground. The output of U5 is connected through C4 to the input of U7. The input of U7 is also connected through R4 to a voltage source V+. R2 and C2 form a delay circuit. C4 and R4 form a differentiator. The output of U7 is connected to trigger 2 output node B, which provides the delayed (second) trigger pulse. The inverters in generators 18, 24 are typically CMOS inverters.

The trigger pulse through U4 is delayed slightly by the RC time constant of R1, C1. This slight delay is defined as T1. The trigger pulse through U5 is delayed by the RC time constant of R2, C2. This delay is defined as T2. The time constant associated with R1, C1 is small compared to the time constant of R2, C2 so that delay T2 is much longer than delay T1. By adjusting R1, the circuit delay may be fine tuned relative to the delayed trigger path. C1 can be a discrete component or just the input capacitance associated with a CMOS gate used for U4. The output of U4 is differentiated by C3 and R3 and the result is a pulse out of U6 that is narrower than the delay between the two pulses. The output of U5 is similarly differentiated by C4 and R4. The output pulse at U7 is delayed relative to the output pulse from U6. The pulse width is set by the differentiated signal at the input to U7, which is usually the same as the input to U6. The two triggers are output at nodes "A" and "B" from which they are sent to the 3-stage pulse amplifiers 20, 26 shown in FIG. 1. The trigger pulse from U6 is the first (essentially nondelayed) trigger pulse and the trigger pulse from U7 is the second (delayed) trigger pulse of the pair of trigger pulses.

Figure 3:
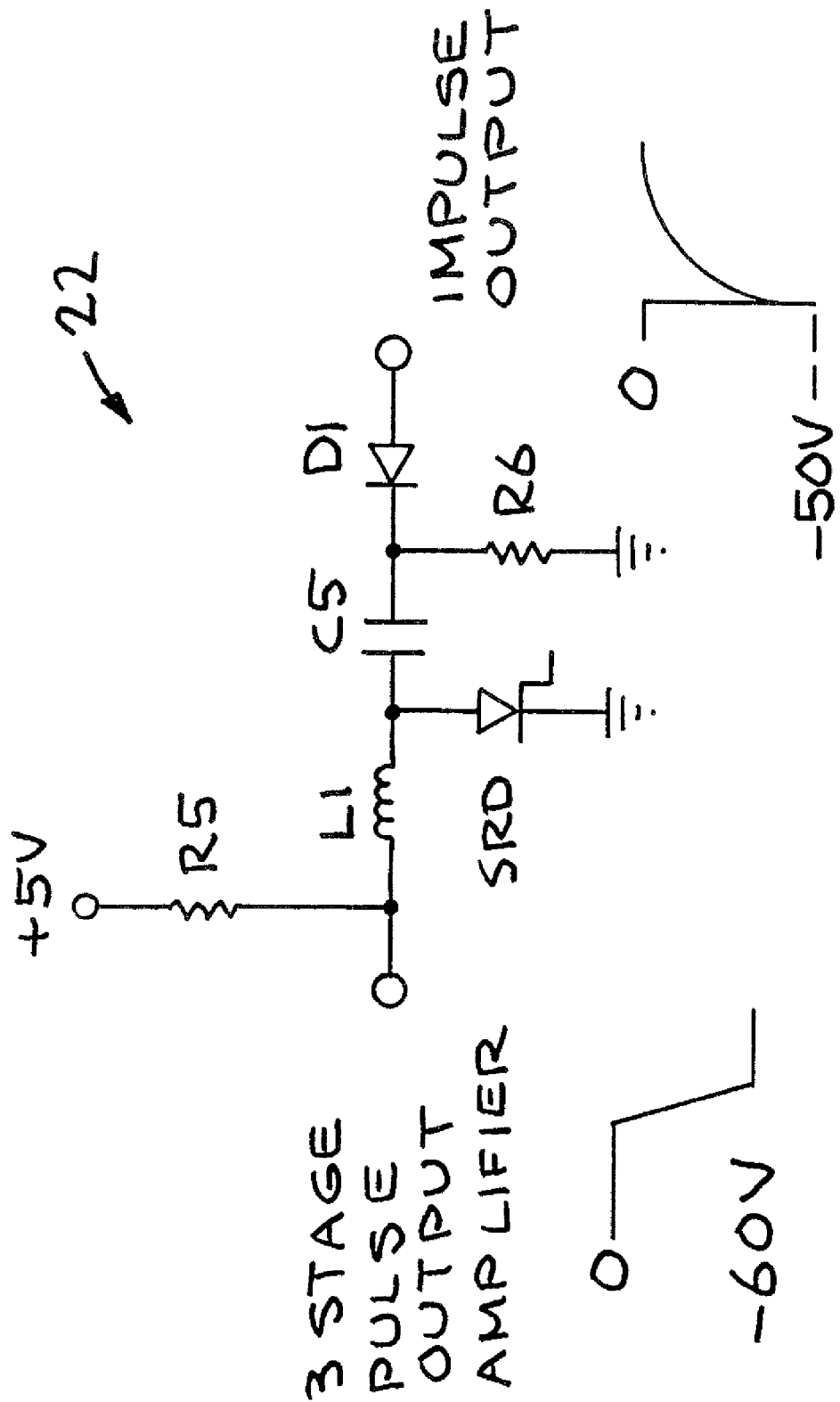
FIG. 3 is a circuit diagram of an embodiment of the SRD pulse forming network of the UWB dual impulse transmitter of FIG. 1.

FIG. 3 shows the SRD pulse forming network 22 (and similarly 28). Pulse forming network 22 is formed of a resistor R5, inductor L1, step recovery diode SRD, capacitor C5 resistor R6, and diode D1. The output of pulse amplifier 20 is applied to one end of inductor L1, which is also connected through R5 to a +5 V voltage source. The SRD is connected from the distal end of L1 to ground. The distal end of L1 is also connected through C5 and reverse positioned D1 to the impulse output node. R6 is connected from the junction between C5 and D1 to ground.

Figure 4C:
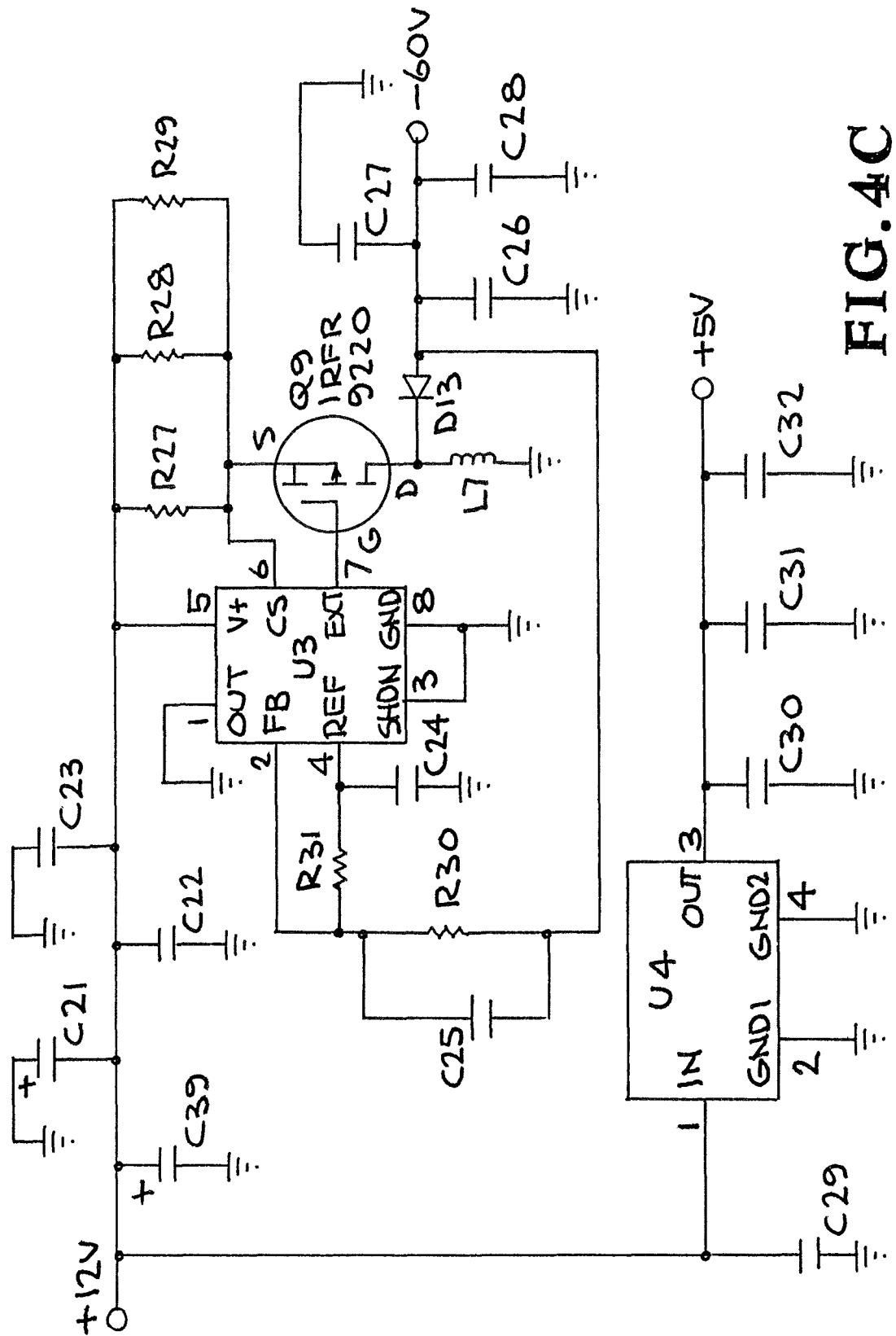
FIG. 4C shows block 1 of FIG. 4B.
Figure 4E:
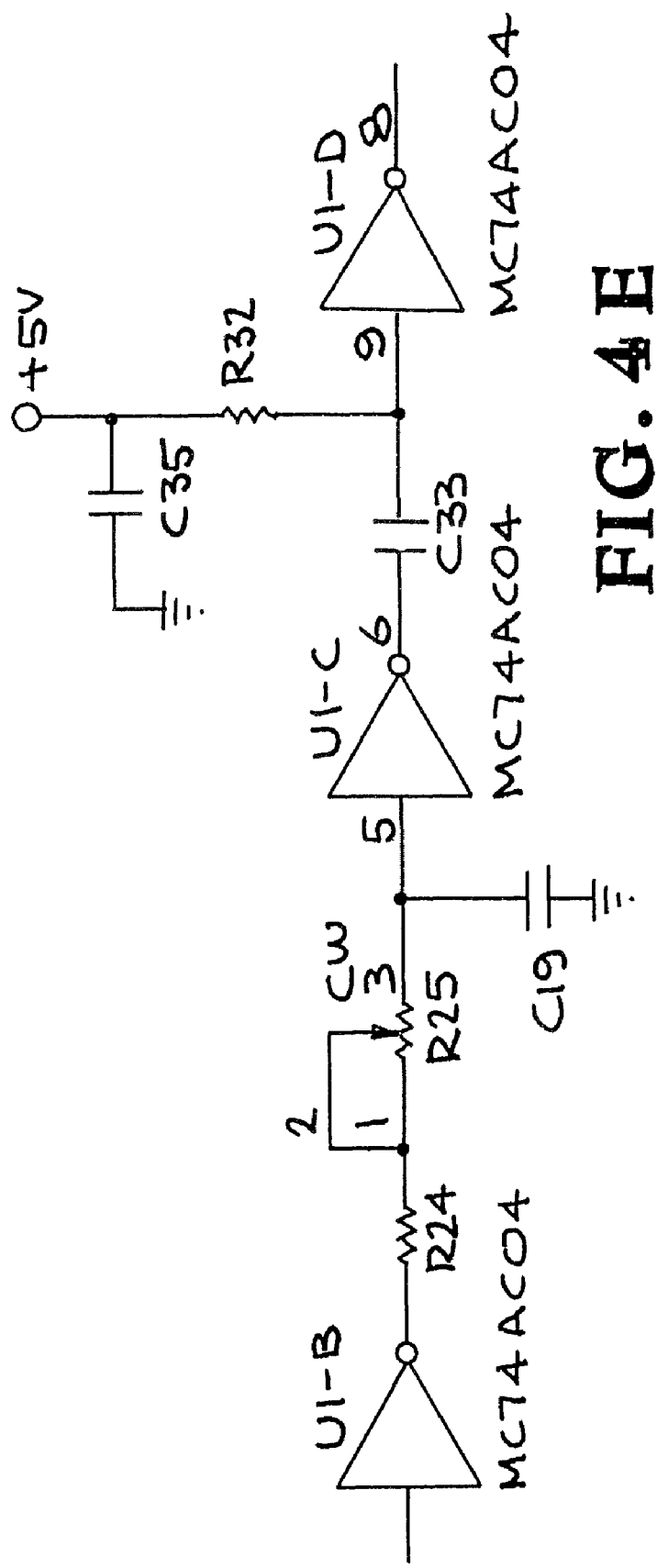
FIG. 4E shows block 3 of FIG. 4B.
Figure 4F:
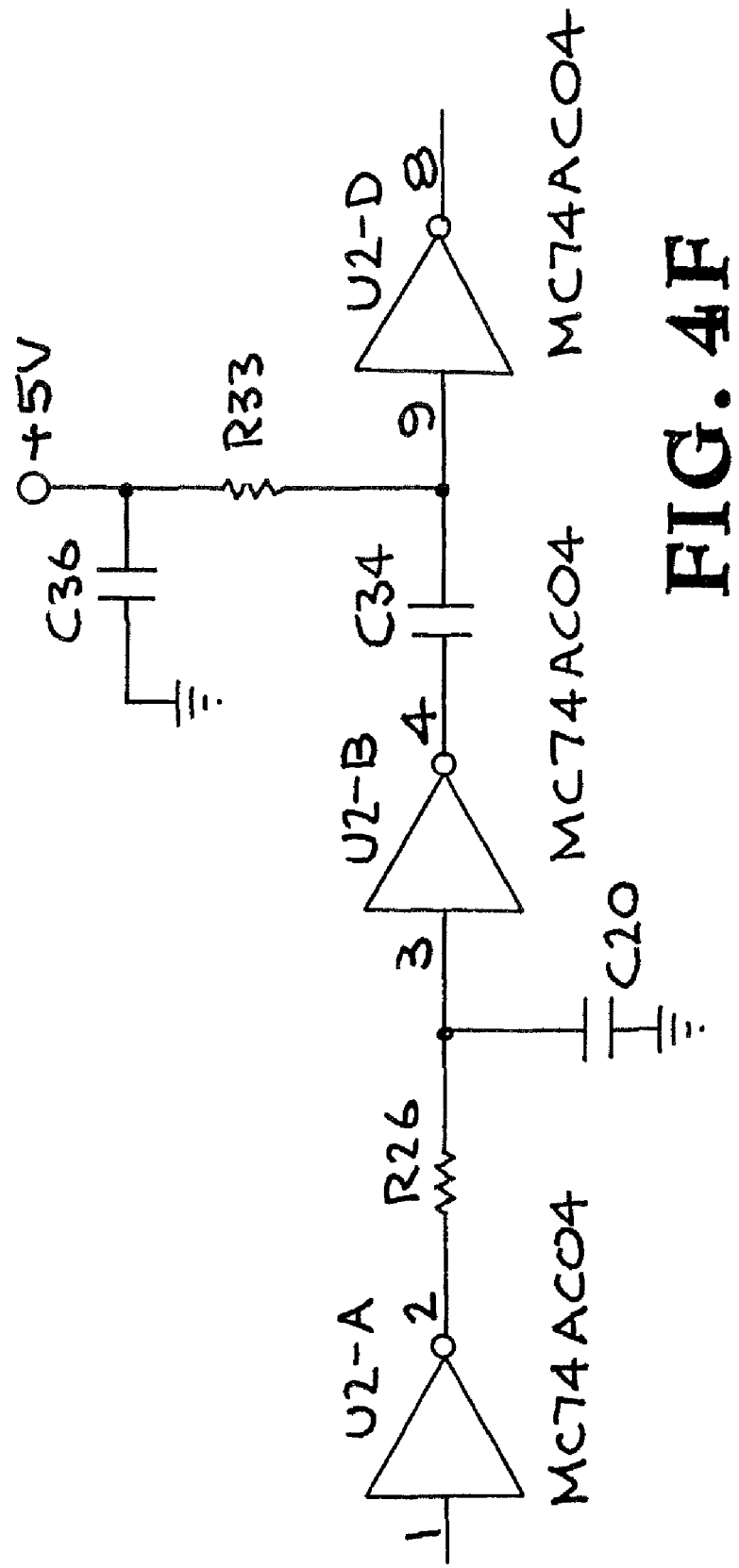
FIG. 4F shows block 4 of FIG. 4B.
Figure 4G:
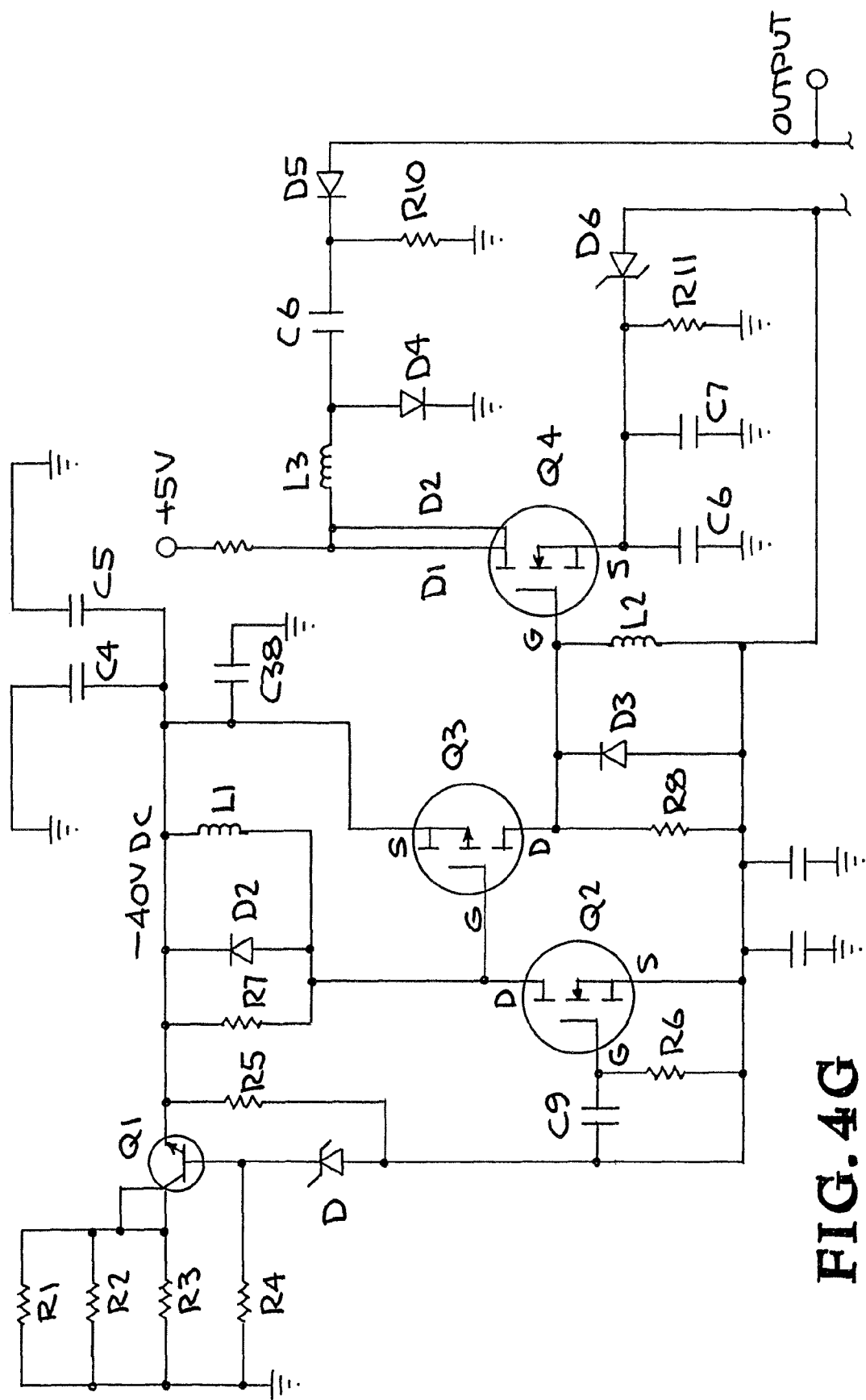
FIG. 4G shows block 5 of FIG. 4B.
Figure 4H:
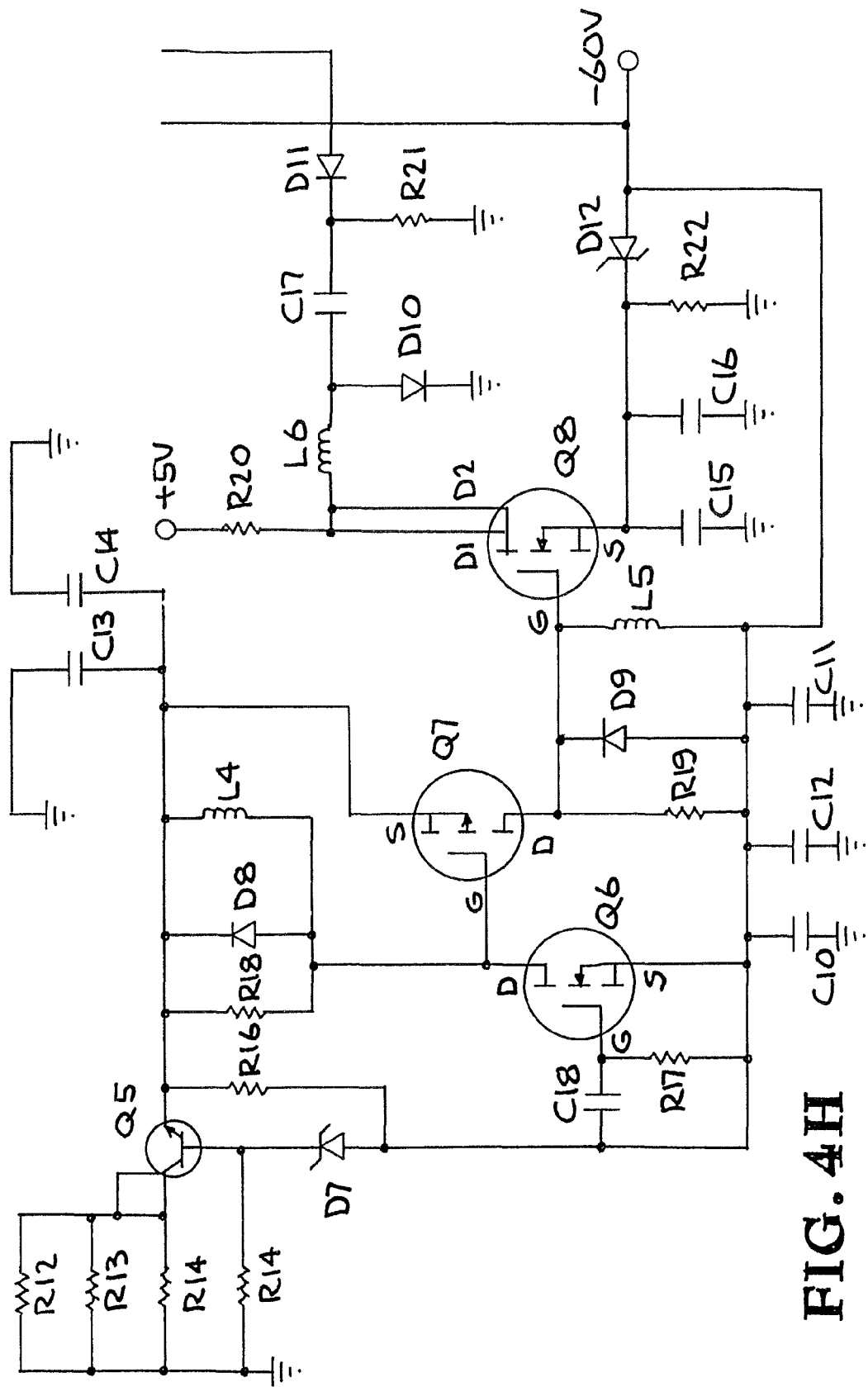
FIG. 4H shows block 6 of FIG. 4B.

FIG. 4A shows schematic of an UWB impulse generator of the invention. FIG. 4B shows the schematic of FIG. 4A divided into blocks 4-7. FIG. 4C shows block 4 of FIG. 4B. FIG. 4D shows block 2 of FIG. 4B. FIG. 4E shows block 3 of FIG. 4B. FIG. 4F shows block 4 of FIG. 4B. FIG. 4G shows block 5 of FIG. 4B. FIG. 4H shows block 6 of FIG. 4B. FIG. 4I shows block 7 of FIG. 4B.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. An ultra-wideband (UWB) dual impulse transmitter, comprising:
   a trigger edge selection circuit actuated by a single trigger input pulse;
   a first step recovery diode (SRD) based pulser connected to the trigger edge selection circuit to generate a first impulse output; and
   a second step recovery diode (SRD) based pulser connected to the trigger edge selection circuit in parallel to the first pulser to generate a second impulse output having a selected delay from the first impulse output.

2. The transmitter of claim 1, wherein the first pulser comprises a variable delay circuit, a pulse amplifier connected to the output of the variable delay circuit, and an SRD pulse forming network connected to the output of the pulse amplifier.

3. The transmitter of claim 1, wherein the second pulser comprises a fixed delay circuit, a pulse amplifier connected to the output of the variable delay circuit, and an SRD pulse forming network connected to the output of the pulse amplifier.

4. The transmitter of claim 3, wherein the outputs of the first and second pulsers are combined at an impulse output node.

5. The transmitter of claim 4, further comprising a transmit antenna coupled to the impulse output node.

6. A method, comprising:
   providing an ultra-wideband (UWB) dual impulse transmitter, comprising:
      a trigger edge selection circuit actuated by a single trigger input pulse;
      a first step recovery diode (SRD) based pulser connected to the trigger edge selection circuit to generate a first impulse output; and
      a second step recovery diode (SRD) based pulser connected to the trigger edge selection circuit in parallel to the first pulser to generate a second impulse output having a selected delay from the first impulse output;
   actuating said trigger edge selection circuit with said single trigger input pulse;
   generating said first impulse output with said first SRD based pulser connected to said trigger edge selection circuit; and
   generating said second impulse output having said selected delay from said first impulse output with said second step recovery diode (SRD) based pulser connected to said trigger edge selection circuit in parallel to said first pulser.

7. The method of claim 6, wherein said first pulser comprises a variable delay circuit, a pulse amplifier connected to the output of the variable delay circuit, and an SRD pulse forming network connected to the output of the pulse amplifier.

8. The method of claim 6, wherein said second pulser comprises a fixed delay circuit, a pulse amplifier connected to the output of the variable delay circuit, and an SRD pulse forming network connected to the output of the pulse amplifier.

9. The method of claim 8, wherein the outputs of the first and second pulsers are combined at an impulse output node.

10. The method of claim 9, further comprising a transmit antenna coupled to the impulse output node.

11. A method, comprising:
    actuating a trigger edge selection circuit of an ultra-wideband (UWB) dual impulse transmitter, wherein said circuit is triggered with a single trigger input pulse;
    generating a first impulse output with a first SRD based pulser of said transmitter, wherein said first SRD based pulser is connected to said trigger edge selection circuit; and
    generating a second impulse output having a selected delay from said first impulse output with a second step recovery diode (SRD) based pulser of said transmitter, wherein said second SRD based pulser is connected to said trigger edge selection circuit in parallel to said first SRD based pulser.

12. The method of claim 11, wherein said first pulser comprises a variable delay circuit, a pulse amplifier connected to the output of the variable delay circuit, and an SRD pulse forming network connected to the output of the pulse amplifier.

13. The method of claim 11, wherein said second pulser comprises a fixed delay circuit, a pulse amplifier connected to the output of the variable delay circuit, and an SRD pulse forming network connected to the output of the pulse amplifier.

14. The method of claim 13, wherein the outputs of the first and second pulsers are combined at an impulse output node.

15. The method of claim 14, further comprising a transmit antenna coupled to the impulse output node.

* * * * *